United States Patent [19]

Hamos

[11] Patent Number: 5,476,088
[45] Date of Patent: Dec. 19, 1995

[54] FLUE PRODUCT EXHAUST AND CONDENSATE COLLECTING SYSTEMS

[75] Inventor: Robert E. Hamos, Simi Valley, Calif.

[73] Assignee: Teledyne Industries, Inc., Los Angeles, Calif.

[21] Appl. No.: 290,539

[22] Filed: Aug. 15, 1994

[51] Int. Cl.⁶ .................................................... F24H 3/02
[52] U.S. Cl. ................................ 126/110 R; 126/116 R; 165/913
[58] Field of Search .................... 126/110 R, 116 R, 126/99 R, 307 R, 312; 122/250 R, 367.3, 406.1; 165/137, 904, 913

[56] References Cited

U.S. PATENT DOCUMENTS 4,318,392  3/1982  Schreiber et al. .................. 126/110 R
4,653,466  3/1987  DeHaan et al. ..................... 126/110 R
5,347,980  9/1994  Shellenberger ..................... 126/110 R

*Primary Examiner*—James C. Yeung
*Attorney, Agent, or Firm*—Benoit Law Corporation

[57] ABSTRACT

A methods and apparatus for exhausting flue products and removing condensate from a combustion of air/gas mixtures provide a condensate collecting pan for flue products. That pan is provided with an inlet for flue products and condensate, and with an outlet for flue products spaced from that inlet. That inlet is provided with a larger cross-section for flue product and condensate flow than the outlet. A space is provided in the pan for a flow of flue products from the inlet at a substantially even velocity across the larger cross-section of the inlet to the smaller cross-section outlet. Condensate collecting in that space is removed from the pan.

20 Claims, 2 Drawing Sheets

FLUE PRODUCT EXHAUST AND CONDENSATE COLLECTING SYSTEMS

FIELD OF THE INVENTION

The subject invention relates to air/gas combustion systems and, more specifically, to methods and apparatus for exhausting flue products and removing condensate from a combustion of air/gas mixtures.

OBJECTS OF THE INVENTION

It is an object of the invention to provide improved condensate collecting systems.

It is also an object of the invention to provide improved methods and apparatus for exhausting flue products and removing condensate from a combustion of air/gas mixtures.

It is a related object of the invention to reduce velocity or pressure discrepancies in exhaust flue product and condensate flow.

Other objects of the invention will become apparent in the further course of this disclosure.

SUMMARY OF INVENTION

The invention resides in a method of exhausting flue products and removing condensate from a combustion of air/gas mixtures, and, more specifically resides in the improvement comprising, in combination, providing a condensate collecting pan for flue products, providing that pan with an inlet for flue products and condensate, providing the pan with an outlet for flue products spaced from that inlet, providing that inlet with a larger cross-section for flue product and condensate flow than said outlet, providing in the pan a space for a flow of flue products from the inlet at a substantially even velocity across the larger cross-section of the inlet to the outlet, and providing for a removal of collected condensate from that pan.

The invention resides also in apparatus for exhausting flue products and removing condensate from a combustion of air/gas mixtures, and, more specifically resides in the improvement comprising, in combination, a condensate collecting pan for flue products having an inlet for flue products and condensate, an outlet for flue products spaced from that inlet, such inlet having a larger cross-section for flue product and condensate flow than the outlet, a space in the pan for a flow of flue products from the inlet to the outlet, such space for a flow of flue products expanding from the inlet to the outlet, and a drain of collected condensate from the pan.

The invention resides also in apparatus for exhausting flue products and removing condensate from a combustion of air/gas mixtures, and, more specifically, resides in the improvement comprising, in combination, a condensate collecting pan for flue products having an inlet for the flue products and condensate, an outlet for flue products spaced from that inlet, such inlet having a larger cross-section for flue product and condensate flow than the outlet, means for providing in the pan for a flow of flue products from the inlet at a substantially even velocity across the larger cross-section of the inlet to the outlet, and means for removing collected condensate from the pan.

BRIEF DESCRIPTION OF THE DRAWINGS

The subject invention and its various aspects and objects will become more readily apparent from the following detailed 4 description of preferred embodiments thereof, illustrated by way of example in the accompanying drawings, in which like reference numerals designate like or equivalent parts, and in which:

FIGS. 2 and 3 are on an enlarged scale relative to FIG. 1.

DESCRIPTION OF PREFERRED EMBODIMENTS

This written description of the invention, including the drawings, disclose methods and apparatus for exhausting flue products 10 and removing condensate 11 from a combustion of air/gas mixtures 12.

Figure 1:
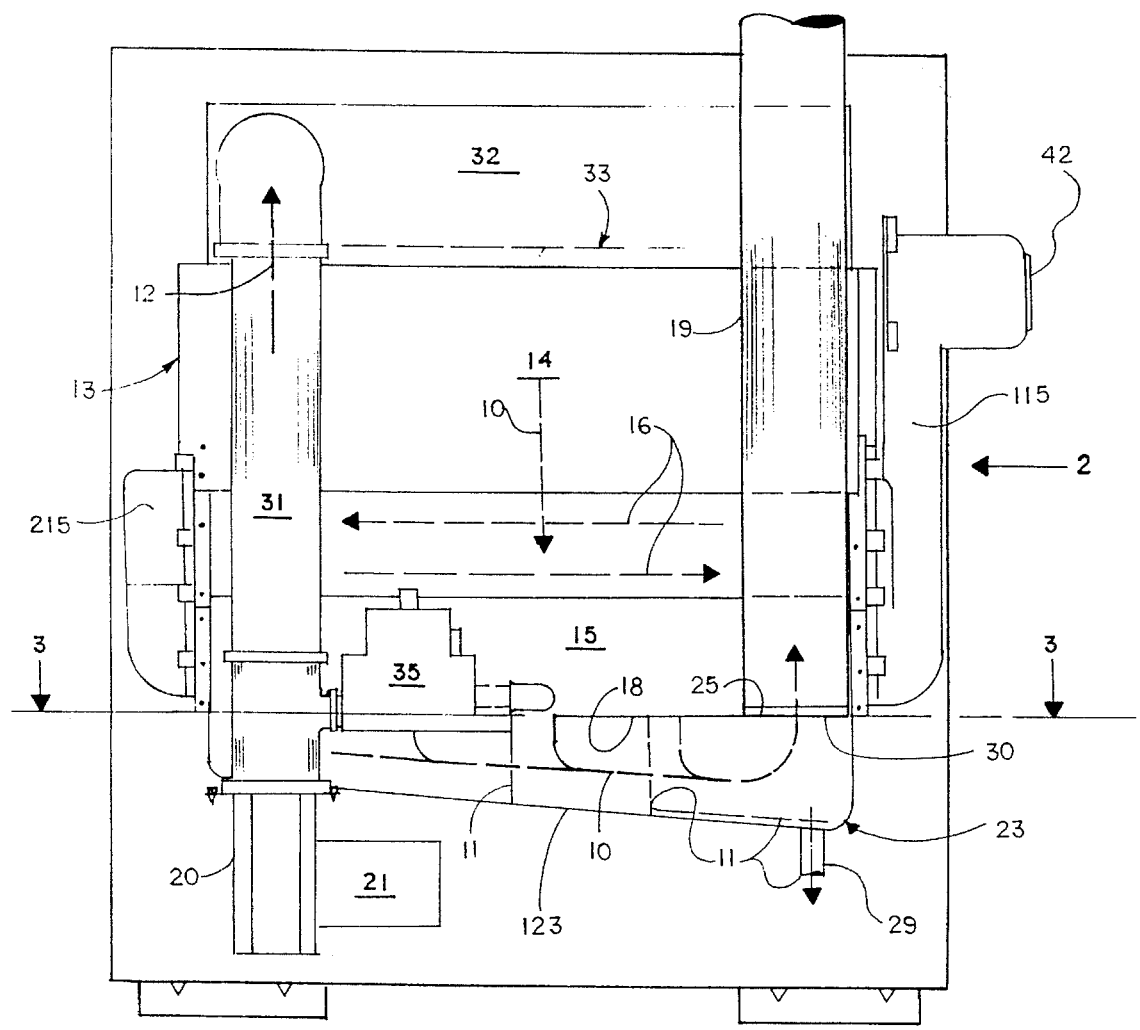
FIG. 1 is an elevation of a gas-fired heater with condensate collecting and exhaust product collecting pan according to a preferred embodiment of the invention.
Figure 3:
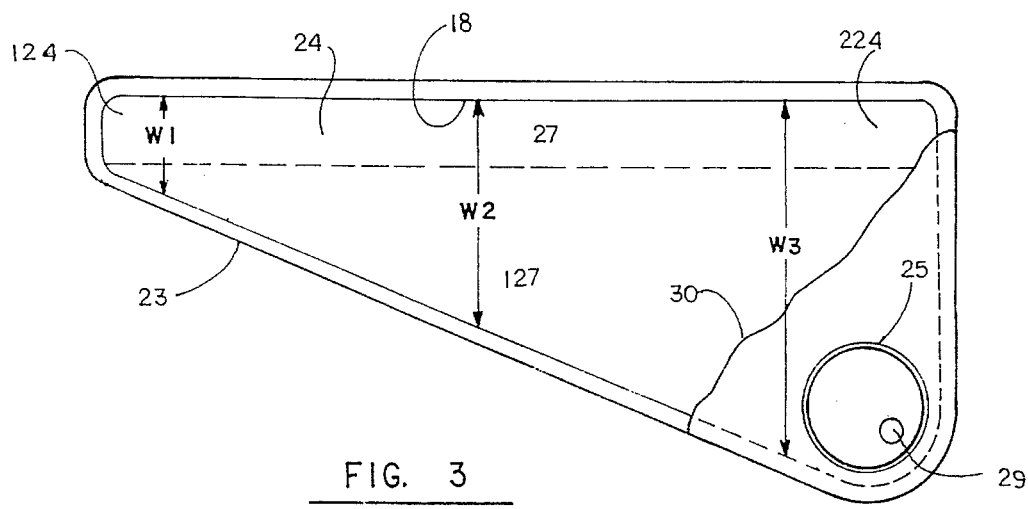
FIG. 3 is a section view taken on the plane 3—3 in FIG. 1 of the collecting pan only.
Figure 2:
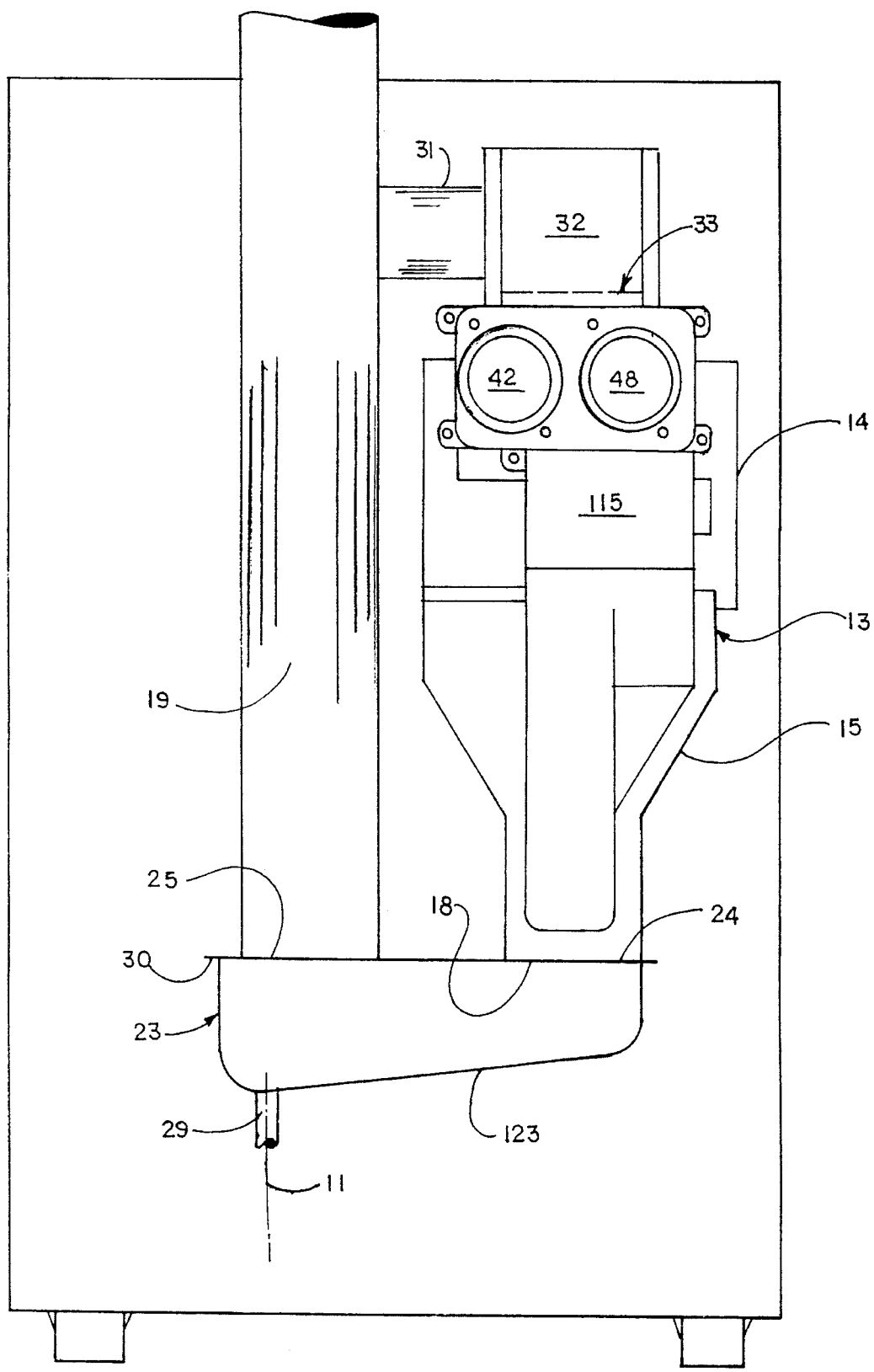
FIG. 2 is a side view of the heater as seen in the direction of arrow 2 in FIG. 1.

FIGS. 1 to 3 in particular show a gas-fired water heater or boiler 13 representative of any gas-fired fluid heater or boiler (hereinafter collectively "heater") wherein any combustion chamber 14 is on top and any heat exchanger 15 is below (in the direction of the earth's gravity) such combustion chamber. That heat exchanger receives from the combustion chamber flue products of combustion 10 which heat the water, air or other fluid 16 (hereinafter collectively "water") in the heat exchanger 15 and, after having given up their heat energy to such fluid, leave that heat exchanger at a bottom opening 18 thereof for exhaust to atmosphere, typically through a smokestack, chimney or other exhaust 19 with or without assistance of a blower thereat. Typically with a downdraft type of water heater, there will be some kind of blower 20 at the origin of the air/gas mixture 12. Such air blower or air/gas blower is visible in FIG. 1 with a drive motor or blower drive 21.

Concentrating now first on the exhaust end of the heater 13, the illustrated preferred embodiment of the invention provides a condensate collecting pan 23 for flue products 10. That pan is provided with an inlet 24 for the flue products and condensate and with an outlet 25 for the flue products spaced from that inlet.

The bottom opening 18 of the heat exchanger 15 is shown in dotted outline in FIG. 3 as issuing into the inlet 24 of the collecting pan 23.

As apparent from FIG. 3 for instance, the collecting pan inlet 24 is provided with a larger cross-section for flue product and condensate flow than its outlet 25. In practice, the larger the difference between the larger cross-section of the collecting pan inlet 24 and the smaller cross-section of its outlet 25, the larger the potential discrepancy in velocity or pressure of the exhausting fluid product 10 across the collecting pan.

The subject invention overcomes this problem and its effects on the operation of the heater by providing in the pan 23 a space 27 for a flow of the flue products 10 from its inlet 24 at a substantially even velocity across the larger cross-section of that inlet to the outlet 25. This in other words results in a substantially even pressure of exhausting flue products 10 across the larger cross-section at 24 to the outlet 25.

In the illustrated preferred embodiment of the invention, the space 27 for a flow of the flue products 10 is expanded from the inlet 24 to the outlet 25 as seen at 127 in FIG. 3 and as may be implied from the relative shapes of the collection pan 23 seen in FIGS. 1 and 2.

As more specifically shown in FIG. 3, the inlet 24 may be provided with an inlet portion 124 more remote from the outlet 25 than another portion 224 of that inlet, and the space 27 for a flow of fluid products 10 is provided with a width expanding from the more remote inlet portion 124 to the outlet 25, such as indicated by the progressively increasing representative width $w_1$, $w_2$, $w_3$ shown in FIG. 3.

The collecting pan 23 may have an inlet 24 that has an Oblong cross-section for flue product flow. The expression "oblong" is used in a dictionary sense of "elongated, usually from the square or circular form," such as, but not limited to "the form of a rectangle one of whose dimensions is greater than the other." That greater dimension runs lengthwise of the heat exchanger 15.

In practice, this oblong configuration of the collecting pan inlet 24 accommodates heater or heat exchanger exhaust product outlets 18 of like or similar oblong configurations.

The flue products outlet 25 of smaller cross-section, on the other hand, accommodates the typical flue exhaust pipes or stacks 19 customary in such installations.

In the preferred illustrated embodiment, the collection pan outlet 25 is longitudinally and laterally offset relative to the oblong cross-section of the inlet 24 and the space 27 for a flow of flue products 10 is expanded in width from that oblong cross-section to the offset outlet 25, such as shown at 127 and $w_1$ to $w_3$ in FIG. 3.

In particular, the inlet 24 may be extended substantially across a width of the pan 23, with the space for a flow of flue products 10 expanding across that width of that pan to the outlet 25, such as shown again by the arrows $w_1$ to $w_3$ from space 27 at pan opening or inlet 24 to the expanded space 127.

As seen in FIGS. 1 and 2, the space in the collecting pan for a flow of flue products 10 is increasing in depth across the width of that pan 23 and toward its outlet. In this respect, the space for a flow of flue products 10 may be provided with a depth increasing from its inlet 24 to its outlet. This in practice supports the principle of expansion of the internal pan space 27 which equalizes flue product velocity or pressure throughout that space.

As already indicated above, the inlet 24 may be provided with an inlet portion 124 more remote from the outlet 25 than another portion 224 of that inlet. In that case, the pan 23 may be shallower at that more remote inlet portion 124 than at the other portion 224 of the inlet 24.

In structural terms, apparatus for exhausting flue products 10 and removing condensate 11 from a combustion of air/gas mixtures 12 comprise a condensate collecting pan 23 for flue products 10 having an inlet for the flue products and condensate, or a flue product and condensate inlet 24, having further an outlet for the flue products, or a flue product outlet 25, spaced from inlet 24, with that inlet having a larger cross-section for flue product and condensate flow than the outlet 25. There is a space 27 in the pan 25 for a flow of flue products 10 from inlet 24 to outlet 25, with such space expanding from inlet 24 to outlet 25, such as seen at 127 in FIG. 3. In practice, this equalizes the velocity or pressure of the exhausting flue product 10 across the cross-section of the pan inlet 24 to the pan outlet 25, and particularly across the longitudinal extent of the oblong pan inlet 24.

Accordingly, the flow of flue products 10 from the heat exchanger 15 into the collecting pan 23 or space 27 and to the flue outlet 25 from remote inlet areas 124 is not impeded by flue product flow into areas of the pan 23 or space 27 more proximate to the flue outlet 25, such as from the most proximate inlet area 224. Similarly, the flow of flue products 10 from heat exchanger areas between the extreme pan inlet regions 124 and 224 to pan outlet 25 is not impeded by flue product flow from either extreme heat exchanger region at pan inlet region 124 or 224 to pan outlet 25.

The beneficial effects of such even velocity, pressure or flow include even heat transfer across the heat exchanger, optimum efficiency of the heater and even improved overall cooling of the hot flue products as a benefit to the environment into which the flue products are exhausted.

Where the inlet 24 has an inlet portion 124 more remote from the outlet 25 than another portion 224 of that inlet, the space 27 for a flow of fluid products 10 expands from that more remote inlet portion 124 to the outlet 25, such as shown at 127 in FIG. 3.

Where the inlet 24 has an oblong cross-section for flue product flow, such as shown in FIG. 3, the outlet 25 may be longitudinally and laterally offset relative to such oblong cross-section and the space for a flow of flue products 10 may be expanding in width from such oblong cross-section to such offset outlet 25, such as seen at 127 in FIG. 3.

Where the inlet 24 extends substantially across a width of said pan 23, the space 27 for a flow of flue products 10 way expand across such width of the pan to its outlet 25, such as shown at $w_1$ to $w_3$ and 127 in FIG. 3.

The space 27/127 for a flow of flue products 10 preferably increases in depth across the width of the pan 23 and toward its outlet. As seen in FIG. 1, the pan 23 preferably has a depth increasing from inlet 24 to outlet 25.

As seen in FIG. 2, the pan 23 may also increase in depth from the proximate inlet region 224 to the outlet 25. However, in a simplified version of the pan 23, the increase in depth the pan 23 or internal pan space 27, or the downward slant of the pan bottom 123 in the direction of flue product flow or exhaust, as seen in FIG. 1, will be sufficient for collection of condensate 11.

Accordingly, where the inlet 24 has an inlet portion 124 more remote from outlet 25 than another portion 224 of that inlet, the pan 23 preferably is shallower at that more remote inlet portion 124 than at such other portion 224 of inlet 24.

Condensate thus collecting in the pan 23 may be removed therefrom by evaporation. This in one way or another diverts heat energy from the heat generation and exchange process and thus impairs efficiency.

Accordingly, while evaporation of condensate is within the scope of the invention, provision of a specific condensate drain 29 at the deepest portion or region of the condensate collecting pan 23 is presently preferred. The drained condensate 11 may be discharged into ground, into a sewer or into a pool of water to be heated by the heater 13, for instance.

The collecting pan 23 may have a top 30 through which the inlet 24 and flue product outlet 25 extend. Most of such top or top plate 30 has been broken away in FIG. 3 for a better view of the inside of the collecting pan 23.

The invention typically is applicable to downdraft heaters. An illustrated description and references to such heaters are contained in the Final Report, January 1987, entitled *High Efficiency Hydronic Heating Unit*, Gas Research Institute (see also *Gas Research Institute TECHNOLOGY PROFILE*, October 1985). That publication mentions blow-through (forced draft) and draw-through (induced draft) combustion systems.

The following patents are herewith incorporated by reference herein for their disclosure of downdraft heaters to which the subject invention may be applied:

U.S. Pat. No. 3,630,175, by Edward A. Reid, Jr., and Robert G. Venendall, issued Dec. 28, 1971, and U.S. Pat. No. 3,734,065, also by Edward A. Reid, Jr., and Robert G. Venendall, issued May 22, 1973, both for fluid heaters and to Columbia Gas System Service Corporation.

This prior art had the customary kind of sloped condensate collecting pan with discharge drain.

By way of example, reference may also be had to U.S. Pat. No. 3,292,598, by Avy I. Miller and Robert M. Ramey, issued Dec. 20, 1966, for Water Heater, and herewith incorporated by reference herein for its disclosure of a multiple-pass type of heat exchanger that may be used at 15 or otherwise in the practice of the subject invention, with or without internal by-pass or valving.

For a heat exchanger of the type contemplated at 15 in FIGS. 1 and 2, reference may be had to International Application PCT/US93/12704, filed 22 Dec. 1993 by the common assignee of the entire interest, and published 29 Jun. 1995 as WO 95/17637.

By way of example, such heat exchanger 15 may have a first header or manifold 115, with water inlet 42, water outlet 48, a second header or pass connecting manifold 215, with internal water turnabout chambers and partition walls, such as of the type shown, for instance, in the above mentioned Miller et al U.S. Pat. No. 3,292,598 incorporated herein.

The illustrated embodiment is a blow-through system, since the blower 20 blows the air/gas mixture 12 through a conduit 31 into a plenum chamber 32 which feeds the air/gas mixture to burners 33 where the gas or fuel is ignited and is burned in the combustion chamber 14 which heats the water or other fluid 16 in the heat exchanger 15. This and the remainder of the operation have already been described above.

Gas or fuel for the combustion process may be supplied through a regulator 35 feeding into a venturi or other system that entrains the gas into the air stream for the air/gas mixture 12. The invention according to the illustrated embodiment may be practiced with all kinds of combustible gases, including butane gas, propane gas, natural gas, and other gaseous fuels. Preferably air is forced-fed and combusted with such butane, propane, natural or other gaseous fuels so that the flames in the combustion chamber 14 burn without a need for secondary air.

Venturi-type and blower air/gas mixing systems with radiant fiber matrix burners have been know for some time as may be seen from the above mentioned publication, but utility of the invention is not limited to any such application.

By way of example, the subject invention is also applicable to draw-through systems, in which case the blower 20 would be an exhaust flue product blower or aspirer in or at the exhaust 19.

However, it is to be understood that design and construction of the air/gas supply, burner, combustion and heat exchanger systems are not part of the invention concerned with flue product exhausting and condensate collecting systems.

Also, the subject extensive disclosure will render apparent or suggest to those skilled in the art various modifications and variations within the spirit and scope of the invention.

I/We claim:

1. In a method of exhausting flue products and removing condensate from a combustion of air/gas mixtures, the improvement comprising in combination:

providing a condensate collecting pan for said flue products;

providing said pan with an inlet for said flue products and condensate;

providing said pan with an outlet for said flue products spaced from said inlet;

providing said inlet with a larger cross-section for flue product and condensate flow than said outlet;

providing in said pan a space for a flow of said flue products from said inlet at a substantially even velocity across said larger cross-section of the inlet to said outlet; and providing for a removal of collected condensate from said pan.

2. A method as in claim 1, wherein:

said space for a flow of said flue products is expanded from said inlet to said outlet.

3. A method as in claim 1, wherein:

said pan has a top; and said inlet and said outlet extend through said top.

4. In a method of exhausting flue products and removing condensate from a combustion of air/gas mixtures, the improvement comprising in combination:

providing a condensate collecting pan for said flue products;

providing said pan with an inlet for said flue products and condensate;

providing said pan with an outlet for said flue products spaced from said inlet;

providing said inlet with a larger cross-section for flue product and condensate flow than said outlet;

providing said inlet with an inlet portion more remote from said outlet than another portion of said inlet;

providing in said pan a space for a flow of said flue products from said inlet at a substantially even velocity across said larger cross-section of the inlet to said outlet and with a width expanding from said more remote inlet portion to said outlet; and providing for a removal of collected condensate from said pan.

5. In a method of exhausting flue products and removing condensate from a combustion of air/gas mixtures, the improvement comprising in combination:

providing a condensate collecting pan for said flue products;

providing said pan with an inlet for said flue products and condensate;

providing said inlet with an oblong cross-section for flue product flow;

providing said pan with an outlet for said flue products spaced from said inlet;

providing said inlet with a larger cross-section for flue product and condensate flow than said outlet;

offsetting said outlet longitudinally and laterally relative to said oblong cross-section;

providing in said pan a space expanded in width from said oblong cross-section to said offset outlet for a flow of flue products from said inlet at a substantially even velocity across said larger cross-section of the inlet to said outlet; and providing for a removal of collected condensate from said pan.

6. In a method of exhausting flue products and removing condensate from a combustion of air/gas mixtures, the improvement comprising in combination:

providing a condensate collecting pan for said flue products;

providing said pan with an inlet for said flue products and condensate;

extending said inlet substantially across a width of said pan;

providing said pan with an outlet for said flue products spaced from said inlet;

providing said inlet with a larger cross-section for flue product and condensate flow than said outlet;

providing in said pan a space for a flow of said flue products expanding across said width of said pan to said outlet for a flow of said flue products from said inlet at a substantially even velocity across said larger cross-section of the inlet to said outlet; and providing for a removal of collected condensate from said pan.

7. A method as in claim 6, wherein:

said space for a flow of said flue products is increasing in depth across said width of said pan and toward said outlet.

8. In a method of exhausting flue products and removing condensate from a combustion of air/gas mixtures, the improvement comprising in combination:

providing a condensate collecting pan for said flue products;

providing said pan with an inlet for said flue products and condensate;

providing said pan with an outlet for said flue products spaced from said inlet;

providing said inlet with a larger cross-section for flue product and condensate flow than said outlet;

providing in said pan a space for a flow of said flue products from said inlet at a substantially even velocity across said larger cross-section of the inlet to said outlet with said space having a depth increasing from said inlet to said outlet; and providing for a removal of collected condensate from said pan.

9. In a method of exhausting flue products and removing condensate from a combustion of air/gas mixtures, the improvement comprising in combination:

providing a condensate collecting pan for said flue products;

providing said pan with an inlet for said flue products and condensate;

providing said pan with an outlet for said flue products spaced from said inlet;

providing said inlet with a larger cross-section for flue product and condensate flow than said outlet;

providing said inlet with an inlet portion more remote from said outlet than another portion of said inlet;

making said pan shallower at said more remote inlet portion than at said other portion of the inlet; and providing for a removal of collected condensate from said pan.

10. In apparatus for exhausting flue products and removing condensate from a combustion of air/gas mixtures, the improvement comprising in combination:

a condensate collecting pan for said flue products having an inlet for said flue products and condensate extending substantially across a width of said pan, an outlet for said flue products spaced from said inlet, said inlet having a larger cross-section for flue product and condensate flow than said outlet;

a space in said pan for a flow of said flue products from said inlet to said outlet;

said space for a flow of said flue products expanding across said width of said pan from said inlet to said outlet; and a drain of collected condensate from said pan.

11. Apparatus as in claim 10, wherein:

said pan has a top; and said inlet and said outlet extend through said top.

12. Apparatus as in claim 10, wherein:

said space for a flow of said flue products increases in depth across said width of said pan and toward said outlet.

13. In apparatus for exhausting flue products and removing condensate from a combustion of air/gas mixtures, the improvement comprising in combination:

a condensate collecting pan for said flue products having an inlet for said flue products and condensate, an outlet for said flue products spaced from said inlet, said inlet having a larger cross-section for flue product and condensate flow than said outlet and said inlet having an inlet portion more remote from said outlet than another portion of said inlet;

a space in said pan for a flow of said flue products expanding from said more remote inlet portion to said outlet; and a drain of collected condensate from said pan.

14. Apparatus as in claim 13, wherein:

said pan has a top; and said inlet and said outlet extend through said top.

15. In apparatus for exhausting flue products and removing condensate from a combustion of air/gas mixtures, the improvement comprising in combination:

a condensate collecting pan for said flue products having an inlet for said flue products and condensate, an outlet for said flue products spaced from said inlet, said inlet having an oblong cross-section for flue product flow and having a larger cross-section for flue product and condensate flow than said outlet;

said outlet being longitudinally and laterally offset relative to said oblong cross-section;

a space in said pan for a flow of flue products expanding in width from said oblong cross-section to said offset outlet; and a drain of collected condensate from said pan.

16. In apparatus for exhausting flue products and removing condensate from a combustion of air/gas mixtures, the improvement comprising in combination:

a condensate collecting pan for said flue products having an inlet for said flue products and condensate, an outlet for said flue products spaced from said inlet, said inlet having a larger cross-section for flue product and condensate flow than said outlet;

a apace in said pan for a flow of said flue products from said inlet to said outlet;

said space for a flow of said flue products expanding from said inlet to said outlet with said pan having a depth increasing from said inlet to said outlet; and a drain of collected condensate from said pan.

17. In apparatus for exhausting flue products and removing condensate from a combustion of air/gas mixtures, the improvement comprising in combination:

a condensate collecting pan for said flue products having an inlet for said flue products and condensate, an outlet for said flue products spaced from said inlet, said inlet having a larger cross-section for flue product and condensate flow than said outlet;

said inlet has an inlet portion more remote from said outlet than another portion of said inlet;

a space in said pan for a flow of said flue products from said inlet to said outlet;

said space for a flow of said flue products expanding from said inlet to said outlet with said pan being shallower at said more remote inlet portion than at said other portion of the inlet; and a drain of collected condensate from said pan.

18. In apparatus for exhausting flue products and removing condensate from a combustion of air/gas mixtures, the improvement comprising in combination:

a condensate collecting pan for said flue products having an inlet for said flue products and condensate, an outlet for said flue products spaced from said inlet, said inlet having a larger cross-section for flue product and condensate flow than said outlet;

means for providing in said pan for a flow of said flue products from said inlet at a substantially even velocity across said larger cross-section of the inlet said outlet; and means for removing collected condensate from said pan.

19. Apparatus as in claim 18, wherein:

said pan has a depth increasing from said inlet to said outlet.

20. Apparatus as in claim 18, wherein:

said pan has a top; and said inlet and said outlet extend through said top.

\* \* \* \* \*